(12) United States Patent
Schaffer

(10) Patent No.: US 8,671,117 B2
(45) Date of Patent: Mar. 11, 2014

(54) SYSTEM AND METHOD FOR SELECTING USER EXPERIENCE DESIGN RESOURCES

(75) Inventor: Eric M. Schaffer, Fairfield, IA (US)

(73) Assignee: Human Factors International, Inc., Fairfield, IA (US)

(*) Notice: Subject to any disclaimer, the term of this patent is extended or adjusted under 35 U.S.C. 154(b) by 48 days.

(21) Appl. No.: 13/081,656

(22) Filed: Apr. 7, 2011

(65) Prior Publication Data

US 2012/0259883 A1 Oct. 11, 2012

(51) Int. Cl.
*G06F 17/30* (2006.01)
(52) U.S. Cl.
USPC ........... 707/796; 707/754; 707/791; 707/792; 707/793; 707/794; 707/795; 707/802; 715/751; 715/809; 705/80; 705/300; 705/301
(58) Field of Classification Search
USPC .............. 707/754, 791–795, 802, 999.1, 707/999.101–103, 999.107; 705/80, 300, 705/301; 715/751, 809
See application file for complete search history.

(56) References Cited

U.S. PATENT DOCUMENTS

| | | | |
|---|---|---|---|
| 2003/0131007 A1* | 7/2003 | Schirmer et al. | 707/100 |
| 2004/0003132 A1 | 1/2004 | Stanley et al. | |
| 2004/0093344 A1 | 5/2004 | Berger et al. | |
| 2010/0185547 A1* | 7/2010 | Scholar | 705/80 |

OTHER PUBLICATIONS

International Search Report and Written Opinion regarding PCT/US2012/32521 issued Jun. 29, 2012, 12 pages.

* cited by examiner

*Primary Examiner* — Syling Yen
(74) *Attorney, Agent, or Firm* — Polsinelli PC

(57) ABSTRACT

A system and method is provided for retrieving disparate design data in connection with the design of a device, a service, or a system. A user design application enables users to store disparate data according to predefined links in a central data source. The user design application also enables users to query the central data source to retrieve relevant disparate design data based on the predefined relationships.

17 Claims, 24 Drawing Sheets

SYSTEM AND METHOD FOR SELECTING USER EXPERIENCE DESIGN RESOURCES

RELATED APPLICATIONS

Not Applicable.

FEDERALLY SPONSORED RESEARCH OR DEVELOPMENT

Not Applicable.

COMPACT DISK APPENDIX

Not Applicable.

BACKGROUND

In the field of User Experience Design (UXD), design professionals leverage an understanding of people and their ecosystems to develop guidelines or specifications that can assist designing applications, services, and products that are usable and persuasive. Various industries and/or businesses employ UXD professionals to study the effectiveness and consumer acceptance of their products and/or services. In general, such studies focus on general human behavior in relation to the technology involved, the type of product or service involved, the specific environment or product design as a whole, or the specific design aspects of a particular environment or product. The results of the study can include suggestions on how to design or redesign a particular object (e.g., devices, systems, and service) being studied or a general guideline for designing that particular object.

UXD professionals are often required to evaluate and consider many different types of data when developing an understanding of people and their ecosystems in connection with a design process for devices, systems, and services. There may be an extremely large amount of data and/or data types that must be considered and each data type can itself be quite complex with large amounts of related information. As a result, UXD professionals often rely on conventional computer aided techniques to perform cross indexing of various data types for such large volumes of data to assist in identifying information that may be relevant to the design of a particular product or service. However, because there can be a significant amount of data types, if each data type must be individually connected to every other data type, the indexing of such content can require significant processing time.

SUMMARY

According to one aspect, a design resource system is provided. The design resource system includes at least one processor and a data source. The data source includes a first table that defines a first linking relationship between a primary data object and at least one secondary data object. The data source also includes a second table that defines a second linking relationship between a different primary data object and a different at least one secondary data object. The data source also includes a third table that defines a third linking relationship between a second different primary data object and another secondary data object.

The design resource system also includes a design resource application that is executed by the processor to receive a query request that specifies a particular data object. The design resource application also queries the data source to identify a matching primary data object in response to the query request. The matching primary data object corresponds to at least one of the primary data object the different primary data object, and the second different primary object that matches the particular data object. The design resource application also generates at least one query result that includes the matching primary data objects and corresponding matching secondary data objects. The corresponding matching secondary data objects include the at least one secondary data object linked to a matched primary data object, the different at least one secondary data object linked to a matched different primary data object, and the other secondary data object linked to a matched second different primary data object. The design resource application also transmits the query result via a result form for display. The result form includes a listing of the matching primary data and the matching secondary data.

According to another aspect, a computer-readable medium encoded with a design resource application is provided. The design resource application includes modules that are executed by a processing device to retrieve design data from a data source. The design resource application includes a filter module to receive a query request that specifies a particular data object. The filter module also queries a data source to identify a matching primary data object in response to the query request. The data source includes a first table that defines a first linking relationship between a primary data object and at least one secondary data object. The data source also includes a second table that defines a second linking relationship between a different primary data object and a different at least one secondary data object. The data source also includes a third table that defines a third linking relationship between a second different primary data object and another secondary data object. The matching primary data object corresponds to at least one of the primary data object the different primary data object, and the second different primary object that matches the particular data object.

The filter module also generates at least one query result that includes the matching primary data objects and corresponding matching secondary data objects. The corresponding matching secondary data objects include the at least one secondary data object linked to a matched primary data object, the different at least one secondary data object linked to a matched different primary data object, and the other secondary data object linked to a matched second different primary data object. The design resource application also includes a user interface module to transmit the query result via a result form for display. The result form includes a listing of the matching primary data and the matching secondary data.

According to another aspect, a method is provided for retrieving design data from a data source. The method includes receiving a query request at a processor. The query request specifies a particular data object. The method also includes querying a data source to identify a matching primary data object in response to the query request. The data source includes a first table that defines a first linking relationship between a primary data object and at least one secondary data object. The data source also includes a second table that defines a second linking relationship between a different primary data object and a different at least one secondary data object. The data source also includes a third table that defines a third linking relationship between a second different primary data object and another secondary data object. The matching primary data object corresponds to at least one of the primary data object the different primary data object, and the second different primary object that matches the particular data object.

The method also includes generating at least one query result at the processor. The query result that includes the matching primary data objects and corresponding matching secondary data objects. The corresponding matching secondary data objects include the at least one secondary data object linked to a matched primary data object, the different at least one secondary data object linked to a matched different primary data object, and the other secondary data object linked to a matched second different primary data object. The method also includes transmitting the query result via a result form for display. The result form includes a listing of the matching primary data and the matching secondary data.

DETAILED DESCRIPTION

Aspects of a design resource system described herein provide users the ability to store disparate data information associated with user experiences in connection with the design of a device, a service, or a system in a central data source. In particular, the design resource system (DRS) enables users the ability to store disparate data according to predefined links in the central data source.

Aspects of the DRS described herein also enable users to query the central data source to retrieve disparate design data associated with devices, services, or systems that corresponds to a particular type of design data specified by the query. Advantageously, the DRS retrieves and displays disparate design data without cross indexing all data types that may be relevant to user experiences in connection with a particular device, service, or system.

Figure 1:
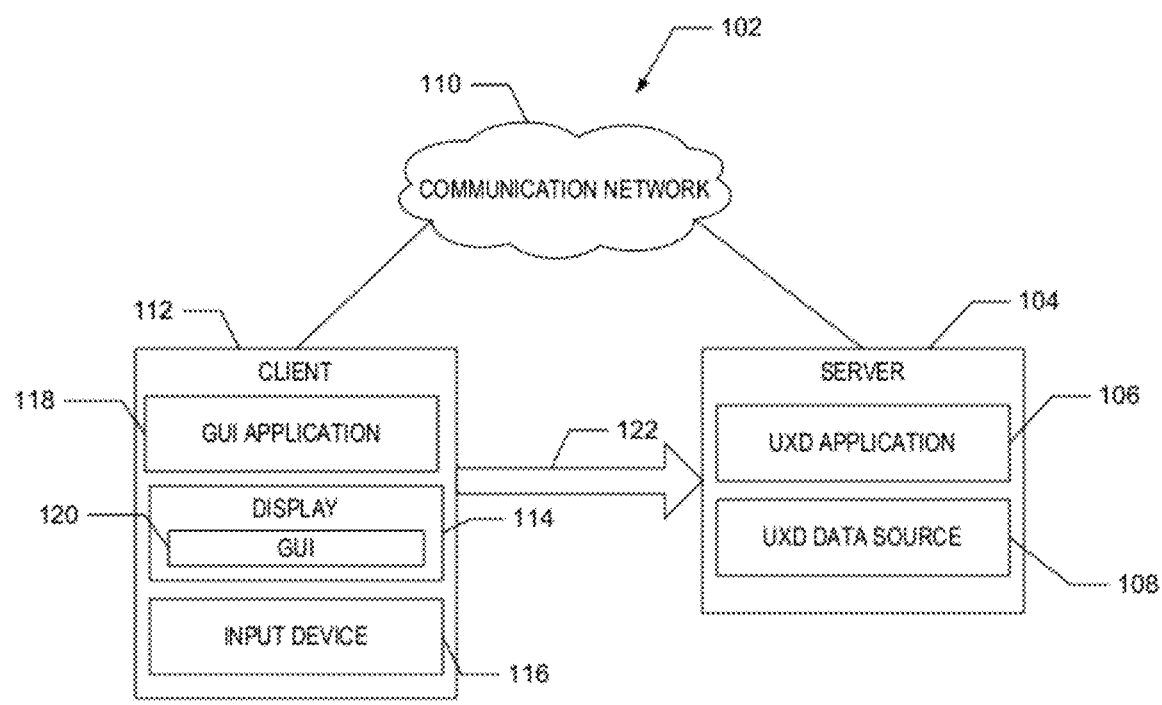
FIG. 1 is a block diagram of a computing environment for a design resource system according to one aspect of the invention.

FIG. 1 depicts an exemplary embodiment of a design resource system (DRS) 102 according to one aspect of the invention. The DRS 102 includes a server computing device ("server") 104 with a UXD application 106, a UXD data source 108, and a communication network 110. According to one aspect, the server 104 receives data and/or communications from, and/or transmits data and/or communications to a client computing device ("client") 112 via the communication network 110.

The communication network 110 can be the Internet, an intranet, or another communication network. In this example, the client 112 and the server 104 may communicate data between each other using Hypertext Transfer Protocol (HTTP), which is a protocol commonly used on the Internet to exchange information between client computers and servers. In another aspect, the client 112 and the server 104 exchange data among themselves via a wireless communication signal, using a WAP which is a protocol commonly used to provide Internet service to digital mobile phones and other wireless devices.

According to one aspect, the client 112 includes a display 114, such as a computer monitor, for displaying design data and/or input forms. The client 112 may also include an input device 116, such as a keyboard or a pointing device (e.g., a mouse, trackball, pen, or touch screen) to enter design data into one or more input forms. The client 112 also includes a graphical user interface (or GUI) application 118, such as a browser application. The graphical user interface application 118 generates a graphical user interface 120 on the display 114 that enables a user of the client 112 to interact with input forms to view the design data retrieved from the UXD data source 108. For example, the client computer 112 communicates with the server 104 to search, retrieve, and display design data from the UXD data source 108. Although the UXD data source 108 is illustrated as being located within the server 104, it is contemplated that in other aspects the UXD data source 108 is located remotely from the server 104, such as at a remote database server (not shown).

Figure 2:
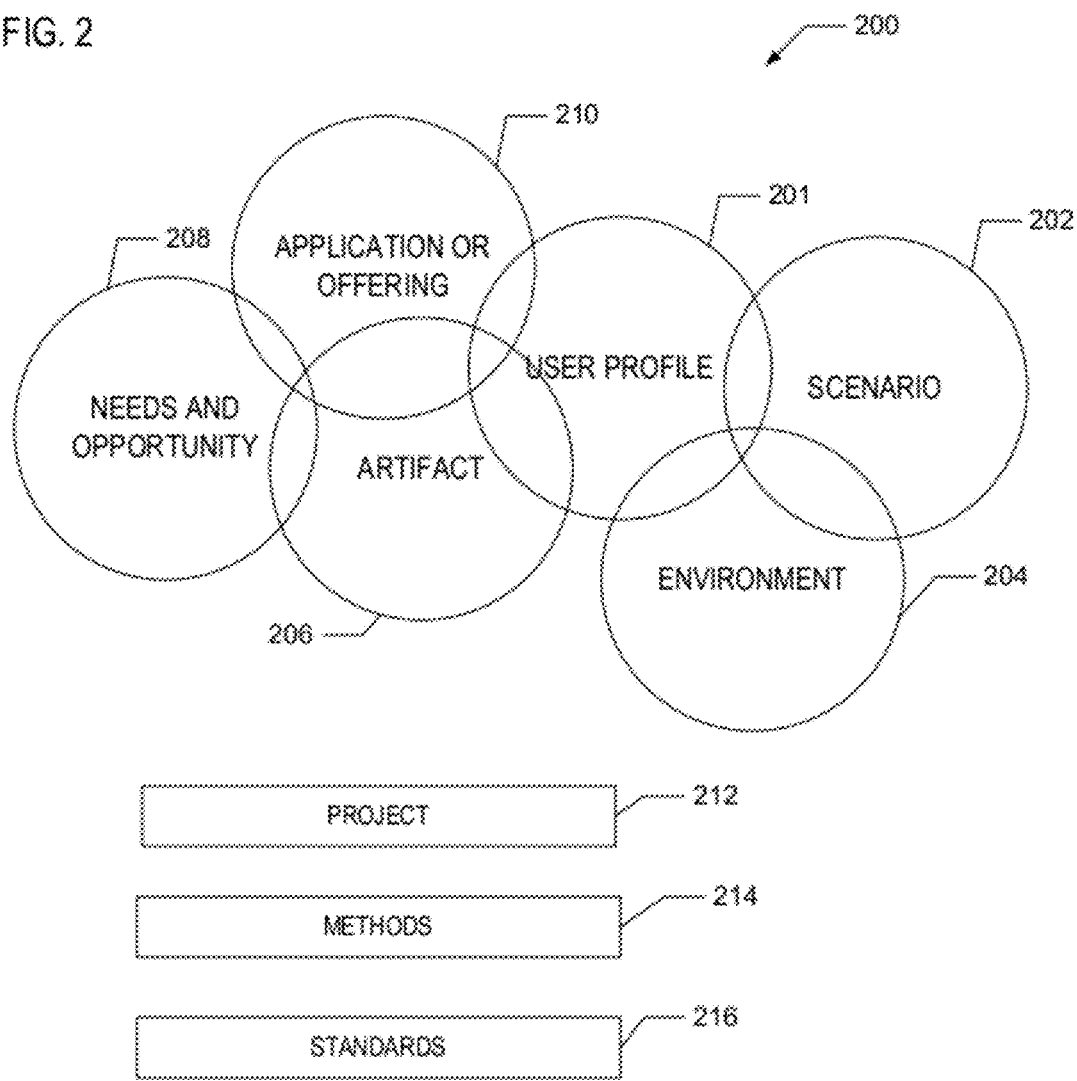
FIG. 2 depicts a core set of data objects used according to one aspect of the design resource system.

According to one aspect, the UXD data source 108 stores a plurality of design data objects associated with various devices, systems, and services. Each design data object ("data object") corresponds to a particular type or category of design data. For example, FIG. 2 depicts a core set 200 of data objects according to one aspect of the DRS 102. In this example, the core data objects 200 include a user profile data object 201, a scenario data object 202, an environment data object 204, an artifact data object 206, a need or opportunity data object 208, an applications or offerings data object 210, a project data object 212, a method data object 214, and a user interface standards data object 216.

The user profile data object 201 defines a category of people of interest to the user experience designer. For example, user profile data object may specify the core values, personality and self image, and decision making style of a start up business owner.

The scenario data object 202 defines a task flow or list of activities of interest to a user experience designer. For example, the scenario object may specify the task flow for opening a bank account.

The environment data object 204 defines a physical space of interest to the user experience designer. For example, in the case of the design for a particular restaurant, the environment data object may specify details about the physical space of the restaurant, such as size, appearance, challenges, etc.

The artifact data object 206 defines a physical tool or object of interest to the user experience designer. For example, the artifact data object 206 may specify details about a cellular phone, such as phone features, battery life, cost, etc.

The need or opportunity data object 208 defines a situation or problem that is a factor or objective in the design. For example, the need or opportunity data object 208 may correspond to the strategic intent of an executive or it may be a specific challenge.

The applications or offerings data object 210 is stored as UXD specification data and describes and/or depicts a user interface that a user will experience. For example, the applications or offerings data object 210 may describe and/or illustrate the various controls that will be displayed to a user on a web page and/or web sites. As another example, the applications or offerings data object 210 may provide specifications and/or guidelines for designing a product or service.

The project data object 212 defines an objective associated with the design of a product or service. The project data object 212 may also identify documents relevant to the objective, such as management and research documents, and may identify a team structure that can be used help facilitate and/or achieve the objective.

The method data object 214 defines a methodology for achieving a particular objective or completing a project. For example, an objective or project may be to conduct an Expert Review analysis and the methodology may explain how to conduct the Expert Review analysis.

The user interface standards data object 216 describes and/or depicts standards for completing a procedure that comprises a number of logical steps. For example, the user interface standards data object 216 may define standards for developing a wizard tool that is used to create user interfaces.

According to one aspect, the UXD data source 108 stores design data objects in one or more tables. Each record in a table identifies, for example, a linked relationship between a primary data object and one or more secondary data objects. As used herein, the terms "primary" and "secondary" are not necessarily used to indicate a hierarchy relationship or level of importance between linked objects. Rather, the primary indicates that a particular data object is associated with at least one other (i.e., secondary) data object. According to one aspect, the UXD data source 108 comprises an objects/scenario link table, a project/object link table, and a UXD specification/standard link table.

Figure 3A:
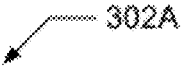
FIG. 3A depicts a scenario/object link table.
Figure 3B:
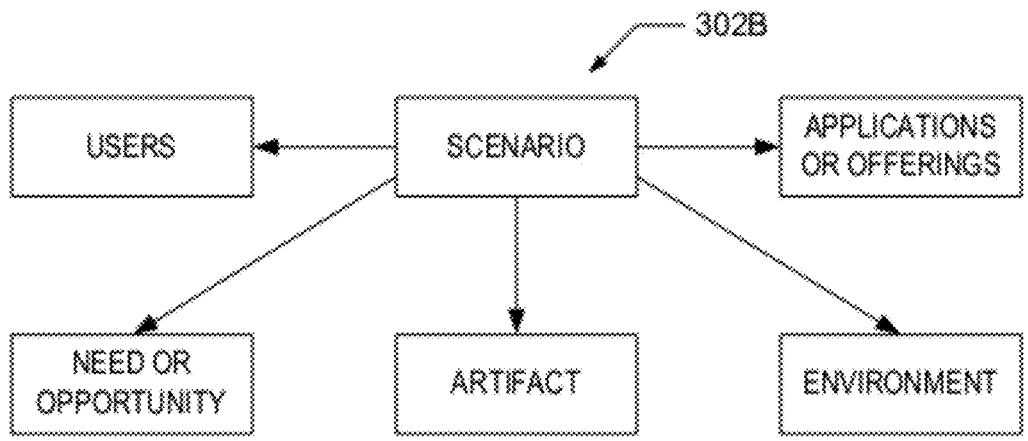
FIG. 3B is a block diagram that depicts linked relationships between a scenario data object and other data objects.

FIG. 3A depicts a scenario/object link table 302A that identifies links between scenario data objects 202 and secondary data objects. In this example, the scenario data object 202 is the primary object. The user profile data object 201, the environment data object 204, the artifact data object 206, the needs and opportunities data object 208, and the applications or offerings (UXD specification) data object 210 are all secondary objects. Each record in the objects/scenario link table 302A identifies a particular scenario, a corresponding task for the scenario data object 202, and a particular secondary data object linked to the scenario data object. Although a group of records in the objects/scenario link table 302A may identify the same scenario, each of such records can identify different secondary objects. FIG. 3B is a block diagram that depicts linked relationships 302B between a scenario data object and other data objects.

Figure 4A:
FIG. 4A depicts a project/object link table.
Figure 4B:
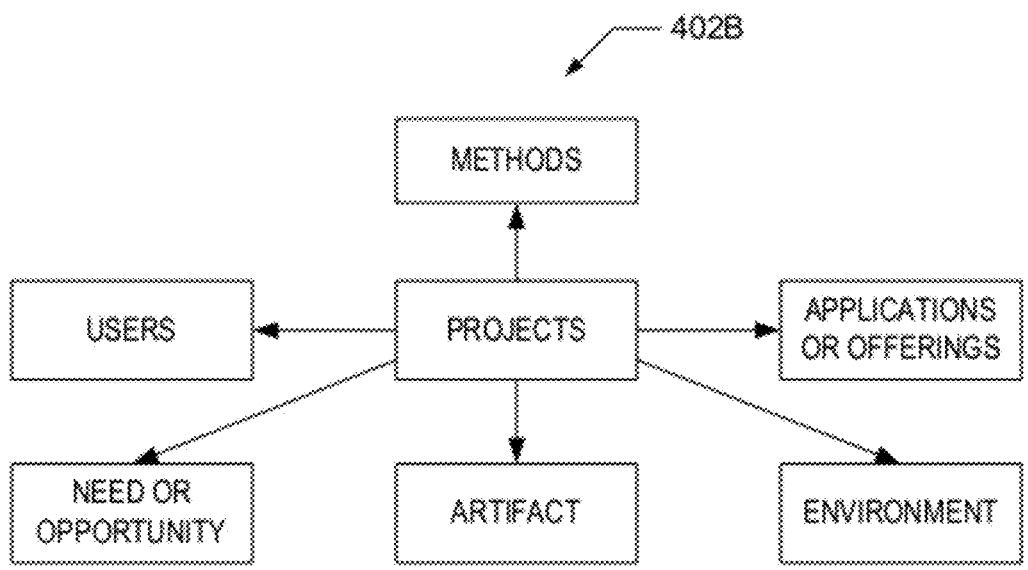
FIG. 4B is a block diagram that depicts linked relationships between a project data object and other data objects.

FIG. 4A depicts a project/object link table 402A that identifies links between a project data object 212 and other data objects. Projects data objects 212 are directly connected with other data objects. In this example, the project data object 212 is the primary data object and the user profile data object 201, the environment data object 204, the artifact data object 206, the needs and opportunities data object 208, and the UXD specification data object 210 are all secondary objects. Each record in the project/object link table 402A identifies a particular project data object and a particular secondary data object linked to that project data object. Notably, a particular project type may not be connected to each secondary object. For example, a project type may involve the study of a particular user, but that same project type may not be connected to any scenario data objects 202. FIG. 4B is a block diagram that depicts linked relationships 402B between a project data object and other data objects.

Figure 5A:
FIG. 5A depicts a UXD specification/standards link table.
Figure 5B:
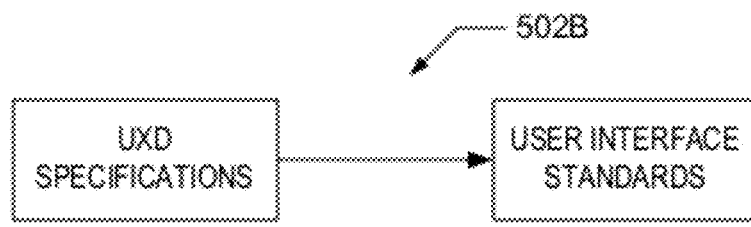
FIG. 5B is a block diagram that depicts linked relationships between a UXD specification data object and user interface standards data object.

FIG. 5A depicts a UXD specification/standards link table 502A that identifies links between UXD specification (e.g., applications and offerings) data objects 210 for application, sites, or product specifications and user interface standard data object 216. In this example, each record in the UXD specification/standards link table 502A identifies a particular UXD specification data object 210 and a particular linked user interface standards data object 216. Thus, only specification data objects and UI standard data objects are linked in this table. FIG. 5B is a block diagram that depicts linked relationships 502B between a UXD specification data object 210 and user interface standards data object 216.

Referring back to FIG. 1, a user can utilize the input device 116 to interact with an input form received from the server 104 to generate a query request 122 to search the UXD data source 108 for design data. The query request 122 may include, for example, selected data object, selected task data, or other user specified input data entered via the input form. According to one aspect, the client 112 transmits the query request 122 to the server 104 via the data communication network 110. The server 104 then retrieves design data from the UXD data source 108 that matches the input data included in the query.

For example, by entering a particular scenario into an input form, a query request 122 that includes the scenario is received at the server 104. The server 104 retrieves secondary data object and/or task data from the UXD data source 108 that corresponds to or matches the scenario input data included in the received query request 122. As an example, the UXD application 106 retrieves corresponding environment data object for the particular scenario from the scenario/object link table 302A in response to the query request 122. As another example, the server 104 can retrieve corresponding artifact data object for the particular scenario from the scenario/object link table 302A in response to the query request 122. Thus, because the UXD data source 108 includes tables that store pre-defined linked relationships connecting a primary data object to other secondary data objects, additional cross indexing is not necessary to identify corresponding design data. As a result, the system enables user to identify relevant design data quickly and efficiently.

According to another aspect, the server 104 retrieves corresponding project data object from the project/object link table 502A for each of the secondary objects identified from the scenario/object link table 302A in response to the query request 122. For example, if a particular needs and opportunities data object is retrieved from the scenario/object link table 302A, the server 104 further retrieves corresponding project data object from the project/object link table 402A in response to the query request 122.

According to yet another aspect, the server 104 retrieves corresponding user interface standards data object 216 from the specification/standards link table 502A in response to the query request 122. For example, if a particular user interface standards data object 216 is retrieved from the scenario/object link table 302A, the server 104 further retrieves corresponding user interface standards data object 216 from the specification/standards link table 502A in response to the query request 122.

Although the DRS 102 is illustrated and described herein as including a server 104 configured with the UXD application 106 and a client 112, it is contemplated that in other aspects the DRS 102 can be implemented with a single client computing device that is configured with the UXD application 106 and the UXD data source 108.

Figure 6:
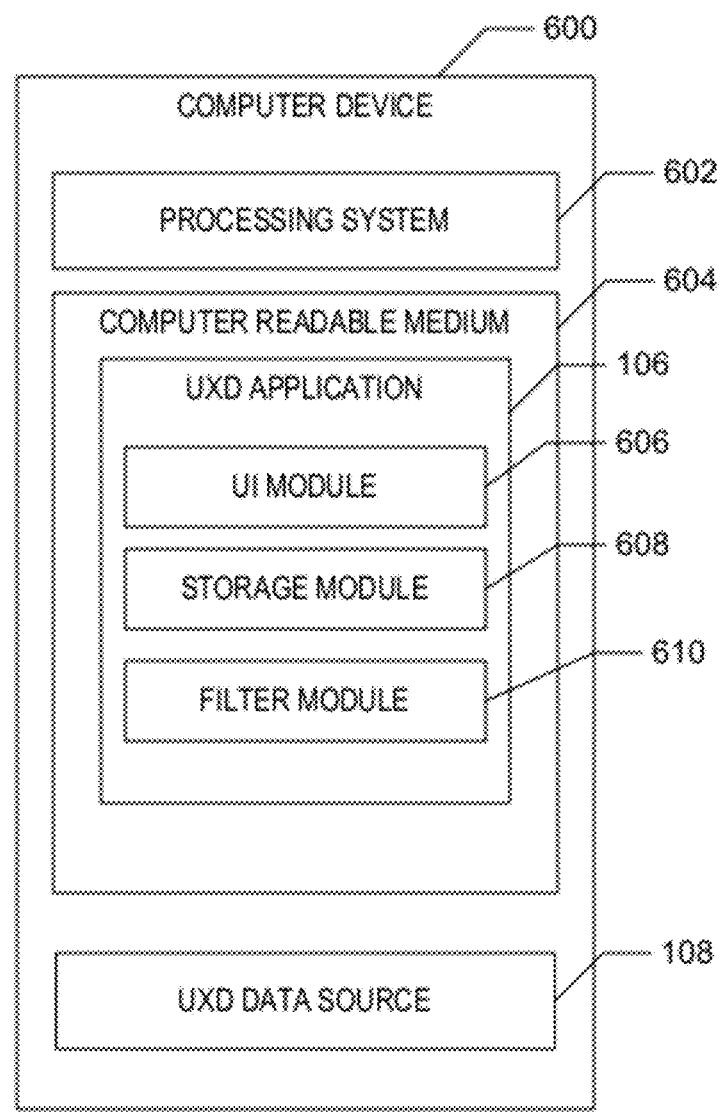
FIG. 6 is a block diagram of a UXD application according to one aspect of the design resource system.

FIG. 6 is a block diagram that depicts an exemplary UXD application 106 executing on a computing device 600.

According to one aspect, the computing device 400 includes a processing system 602 that includes one or more processors or other processing devices. The processing system 602 executes an exemplary UXD application 106 to retrieve design data from the UXD data source 108 for transmission to the client 112.

According to one aspect, the computing device 600 includes a computer readable medium ("CRM") 604 configured with UXD application 106. The UXD application 106 includes instructions or modules that are executable by the processing system 602 to retrieve the design data from the UXD data source 108 for transmission to the client 112 in response to a received query.

The CRM 604 may include volatile media, nonvolatile media, removable media, non-removable media, and/or another available medium that can be accessed by the computing device 600. By way of example and not limitation, computer readable medium 604 comprises computer storage media and communication media. Computer storage media includes memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A UI module 606 transmits one or more input forms to the client 112 after the client accesses the UXD application 106 on the server 104 by, for example, entering a uniform resource locator (URL) via the client 112. As described above, the user of the client 112 interacts with the one or more input forms to enter design data objects and generate a storage request. FIGS. 7A-7F depict exemplary screen shots of the one or more input forms transferred to the client 112 by the UI module 606.

Figure 7A:
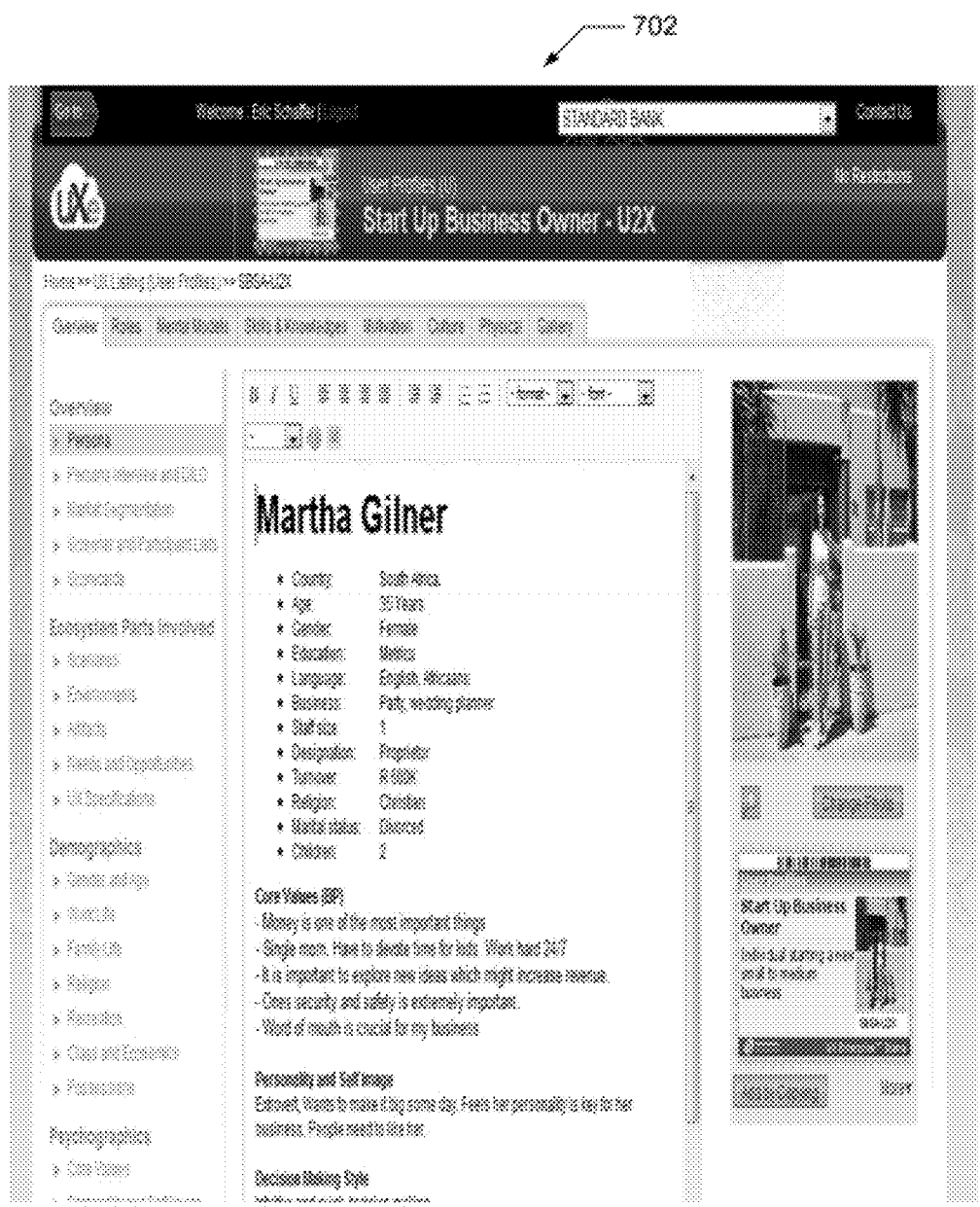
FIGS. 7A-7J depict screen shots of various input forms.

FIG. 7A depicts a user profile input data form 702. The user of the client 112 interacts with the user profile input data form 702 to enter user profile data and generate a corresponding storage request.

Figure 7B:

FIG. 7B depicts a scenario data input form 704. The user of the client 112 interacts with the scenario data input form 704 to enter scenario data object and generate a corresponding storage request.

Figure 7C:

FIG. 7C depicts an environment data input form 706. The user of the client 112 interacts with the environment data input form 706 to enter environment data object and generate a corresponding storage request.

Figure 7D:
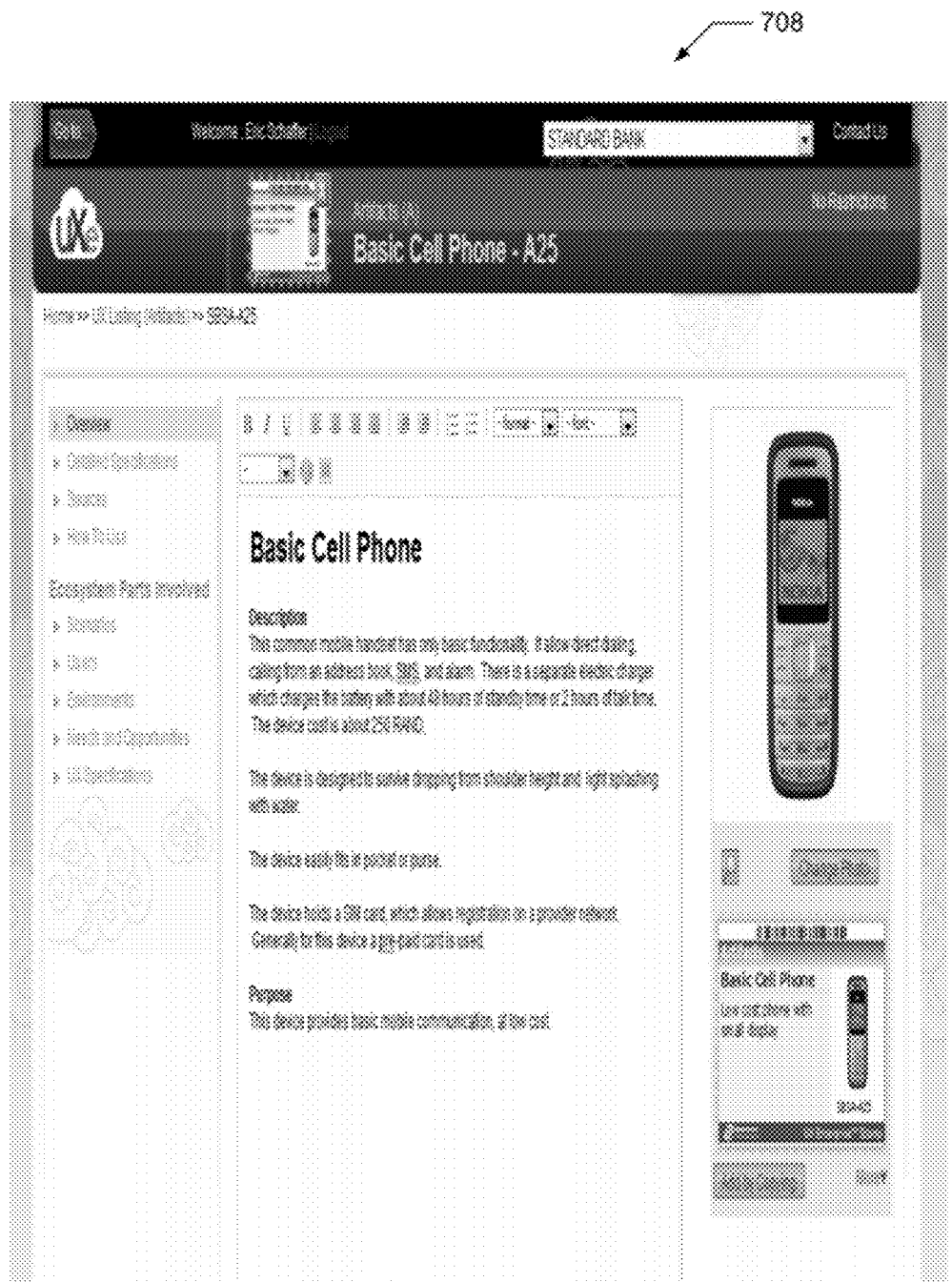

FIG. 7D depicts an artifact data input form 708. The user of the client 112 interacts with the artifact data input form 708 to enter artifact data object and generate a corresponding storage request.

Figure 7E:
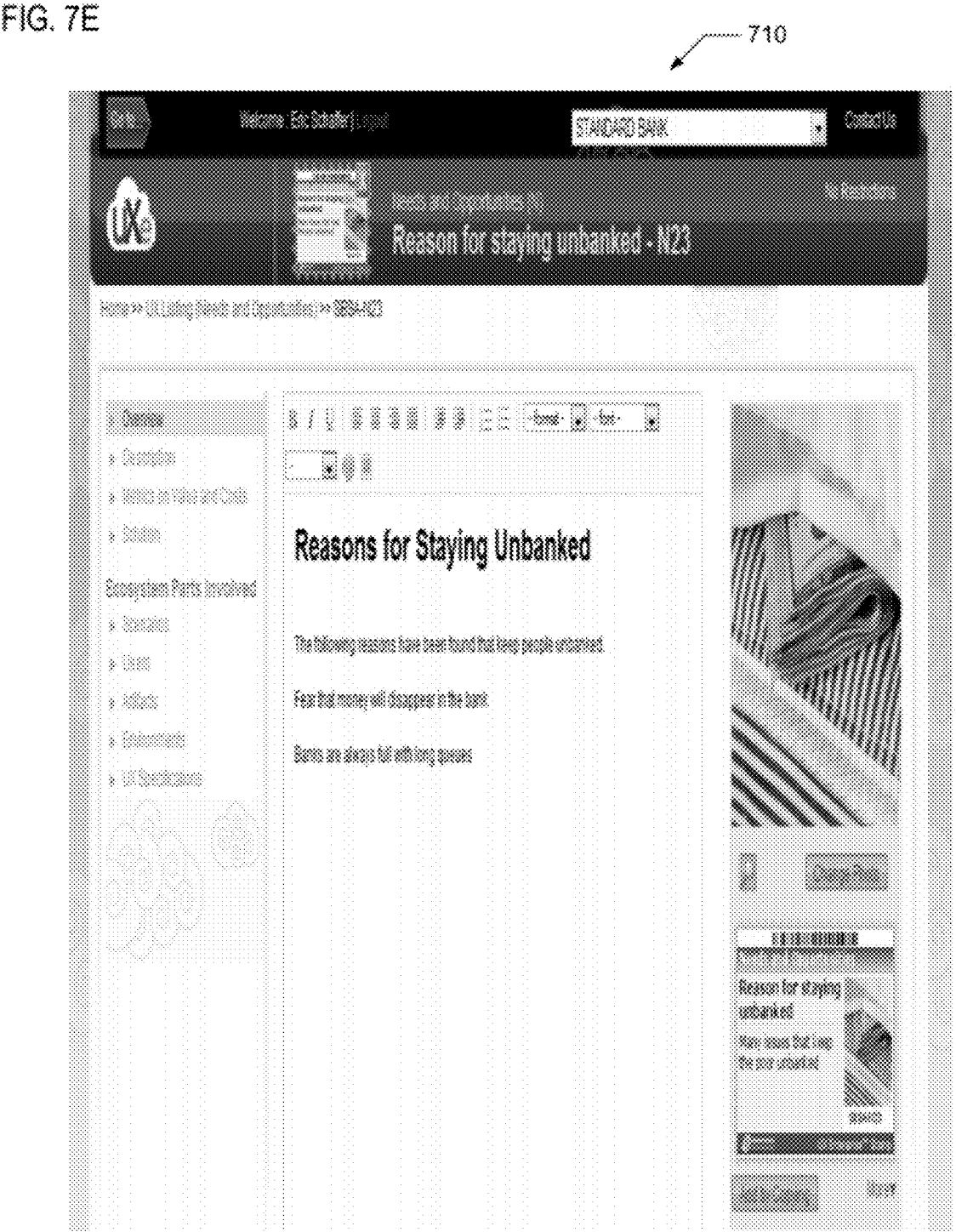

FIG. 7E depicts a need or opportunity data input form 710. The user of the client 112 interacts with the need or opportunity data input form 710 to enter need or opportunity data object and generate a corresponding storage request.

Figure 7F:
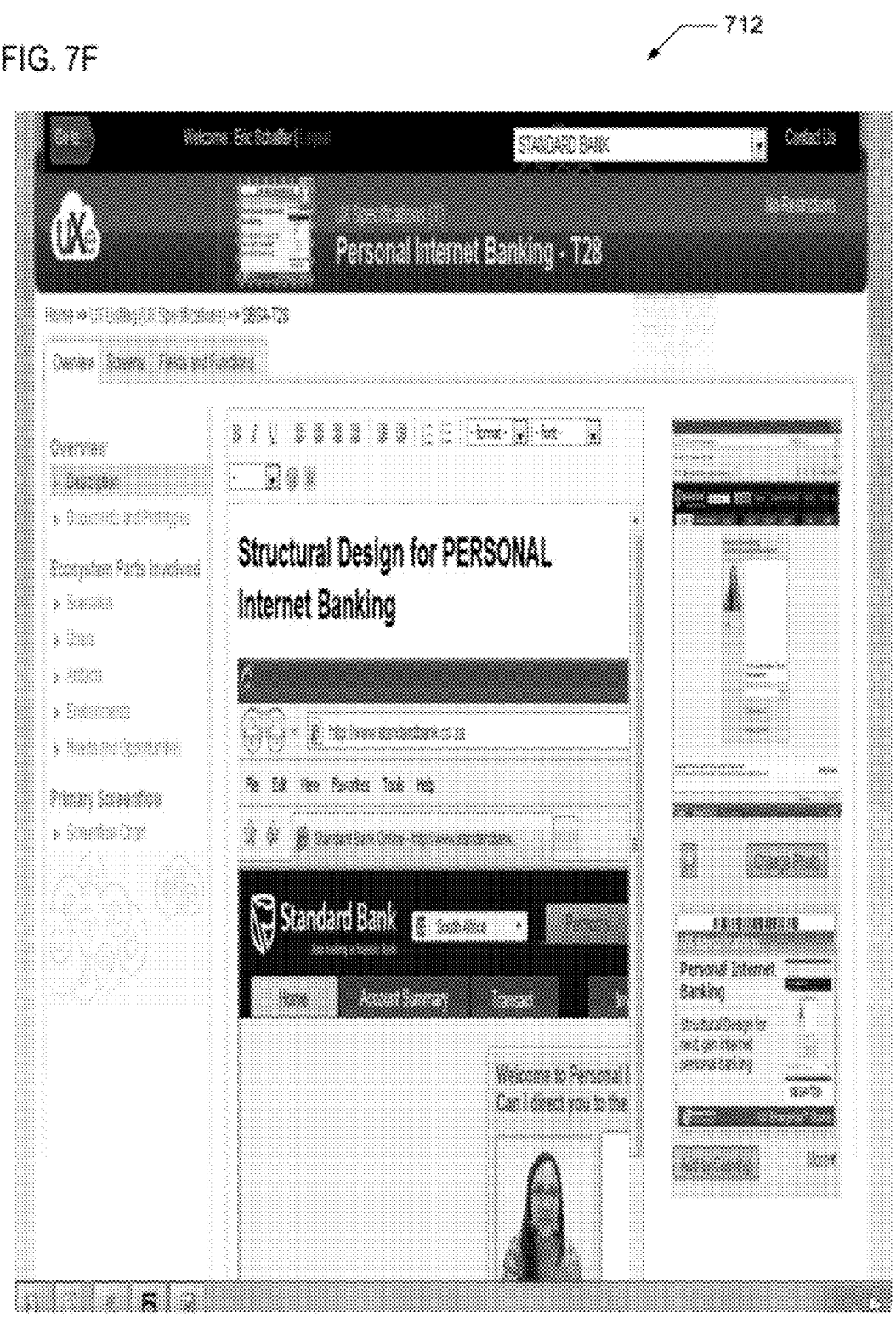

FIG. 7F depicts an applications or offerings data input form 712. The user of the client 112 interacts with the applications or offerings data input form 712 to enter applications or offerings data object and generate a corresponding storage request.

Figure 7G:
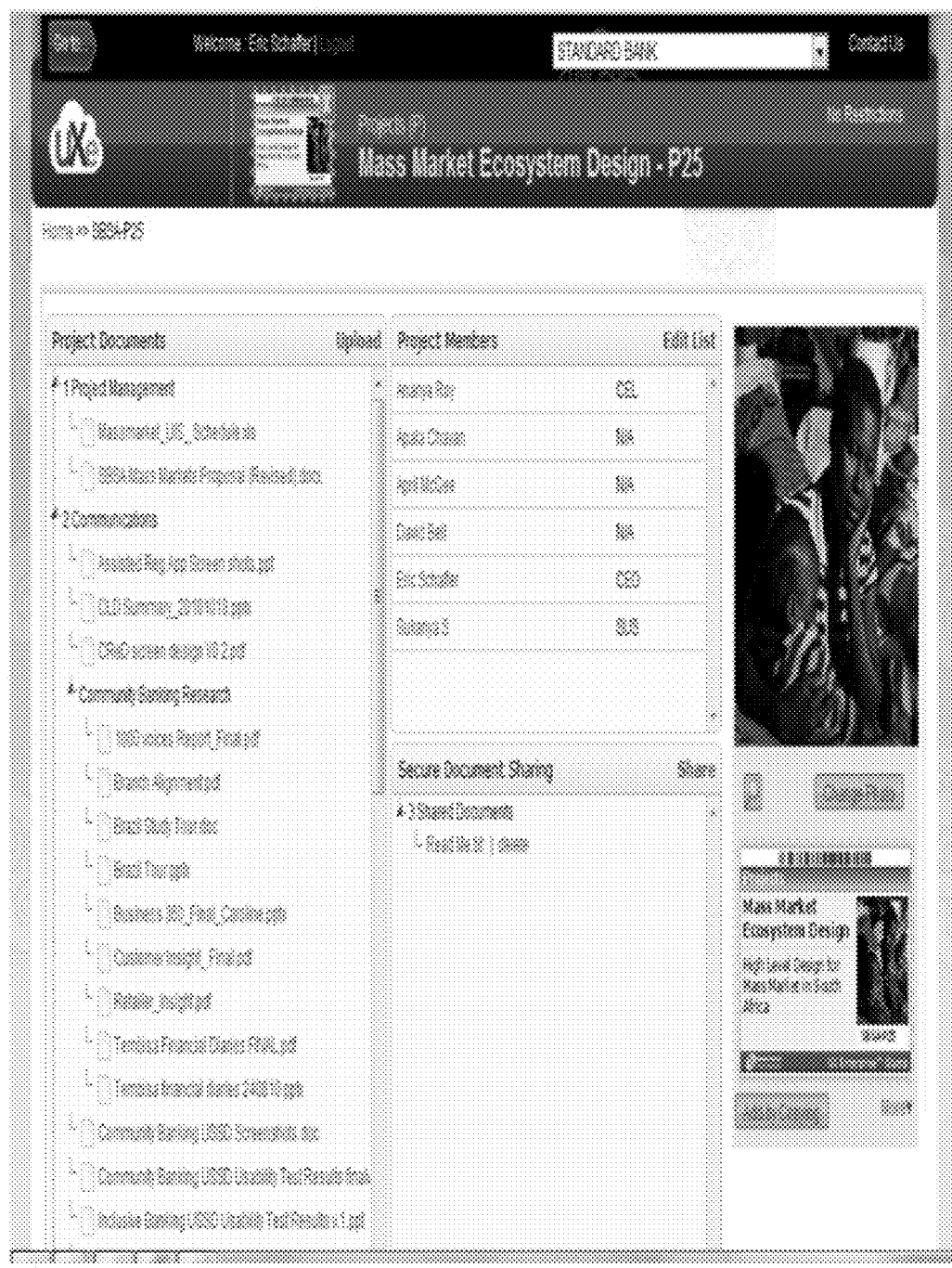

FIG. 7G depicts a project data input form 714. The user of the client 112 interacts with the project data input form 714 to enter project data object and generate a corresponding storage request.

Figure 7H:
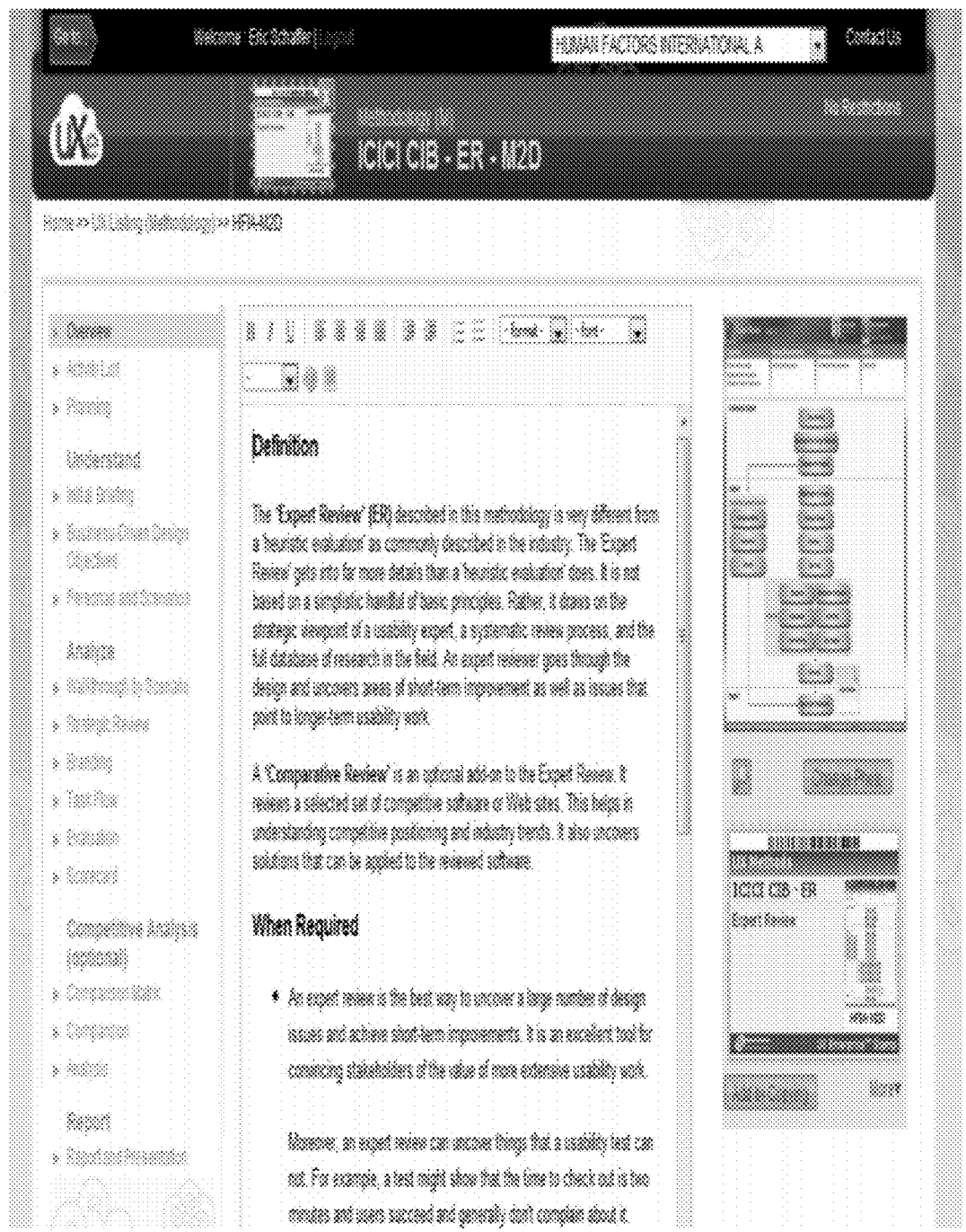

FIG. 7H depicts a methods data input form 716. The user of the client 112 interacts with the methods data input form 716 to enter method data object and generate a corresponding storage request.

Figure 7I:
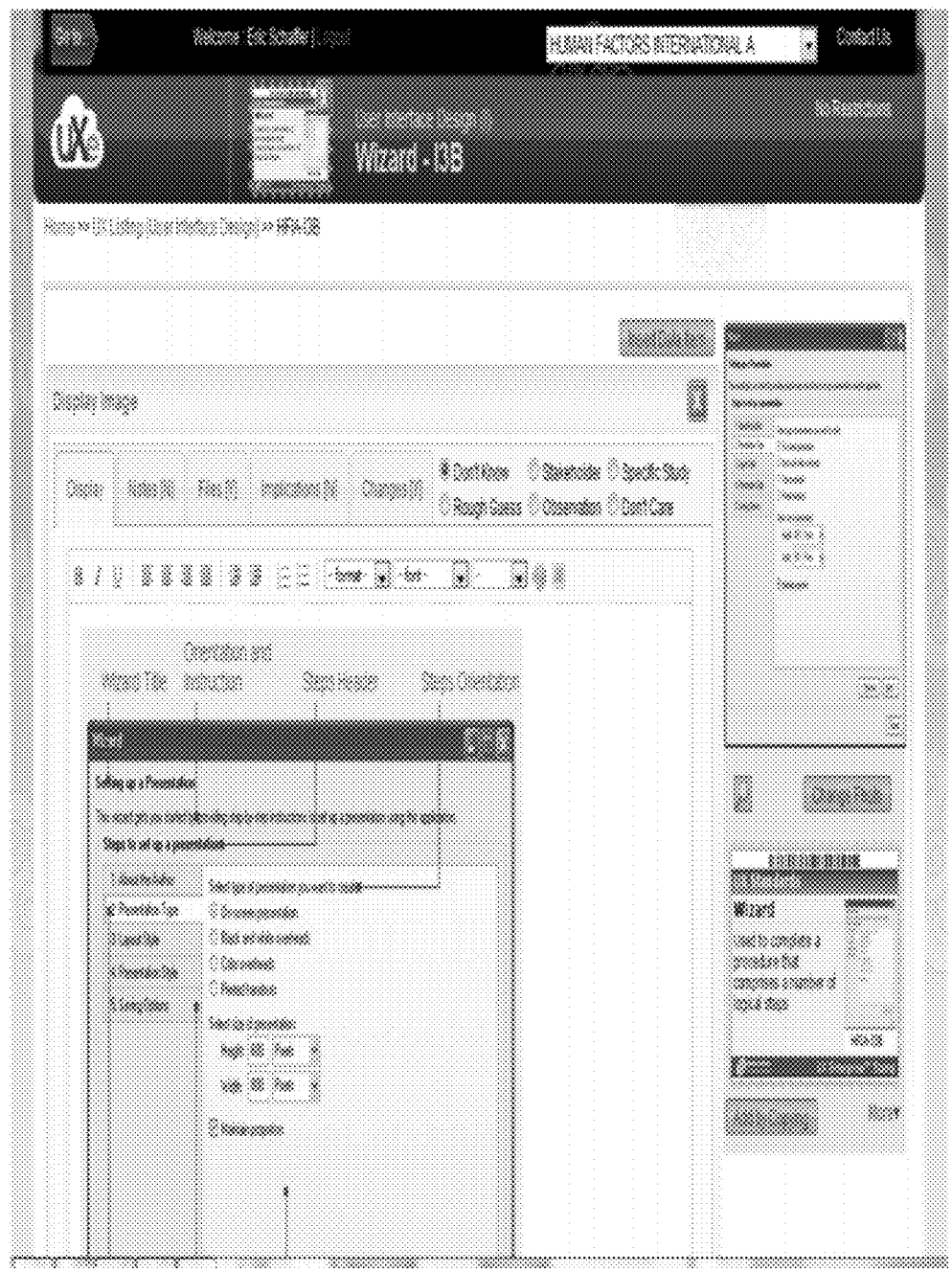

FIG. 7I depicts and a standards input form 718. The user of the client 112 interacts with the standards input form 718 to enter and/or view user interface standards data object 216 and generate a corresponding storage request.

Figure 7J:
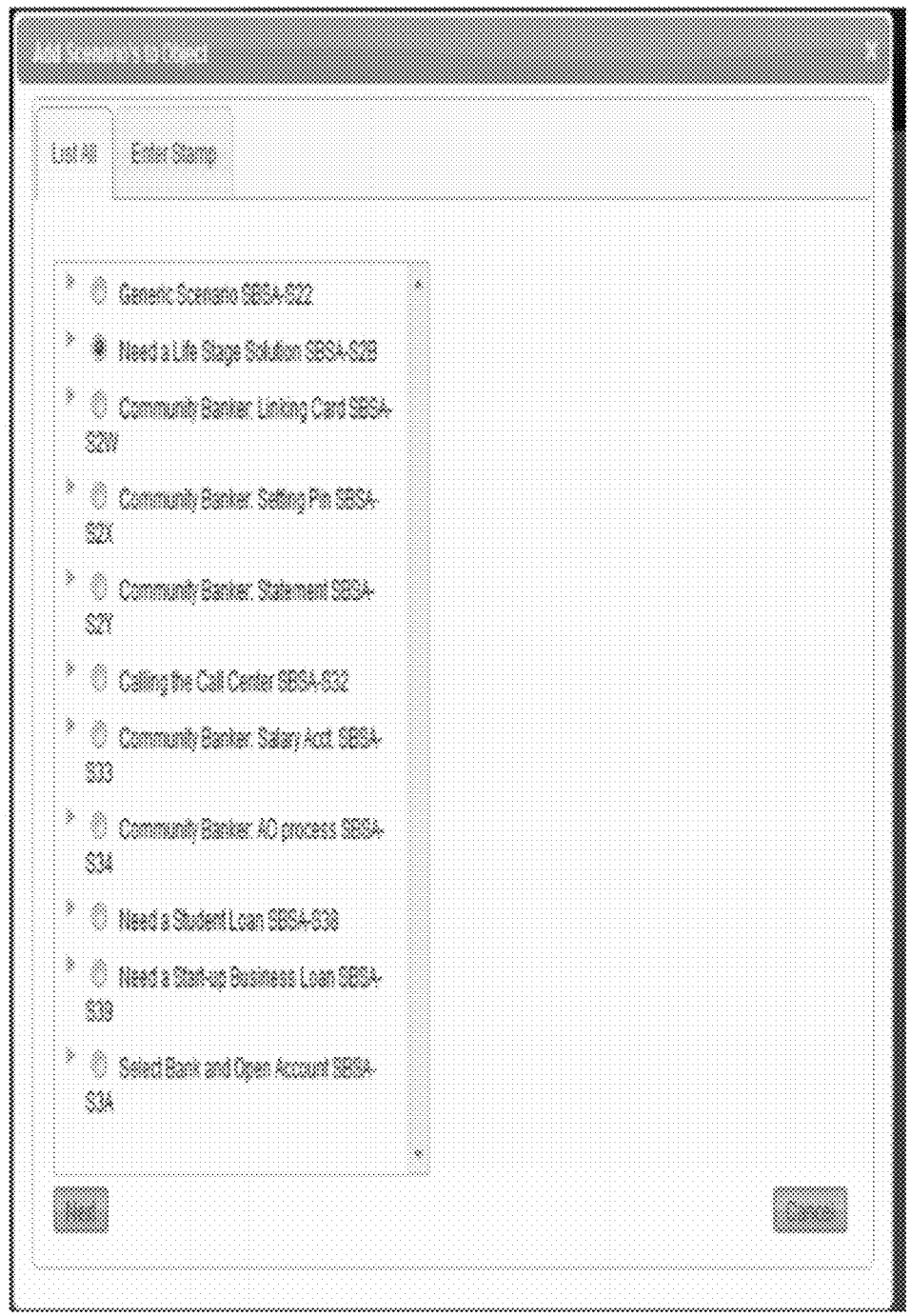

FIG. 7J depicts and a linkage form 720. The user of the client 112 interacts with the linkage form to link user profiles scenarios.

Referring back to FIG. 6, a storage module 608 stores data object in an appropriate table in the UXD data source 108 in response to a received storage request. For example, if the storage module 608 receives a storage request in response to a user interacting with a scenario data input form 704, the storage module 608 stores the scenario data object included in the request in the scenario/object link table 302A. As another example, if the storage module 608 receives a storage request in response to a user interacting with a project data input form 704, the storage module 608 stores the project data object included in the request in the a project/object link table 402A.

According to another aspect, the UI module 606 may display a query input form to the client. A user of the client 112 interacts with the query input form (not shown) to define particular design data object and generate a query to search the database for other design data object related to the particular design data object.

A filter module 610 receives the query request from the client 112 and queries or filters the tables in the UXD data source 108 to identify data object that matches the particular design data object included in the query and generates a query result. The query result includes a listing of design data objects that are linked directly to the particular design data object or that are linked to other design data objects that are linked to the particular design data object. Examples of queries performed by the filter module 610 are described below in reference to FIGS. 9A-9I.

According to another aspect, the UI module 606 transmits the query result to the client 112 for display. The query result is displayed, for example, via a results form that includes, for example, a listing of all the data object retrieve from the database in response to a query.

Figure 8:
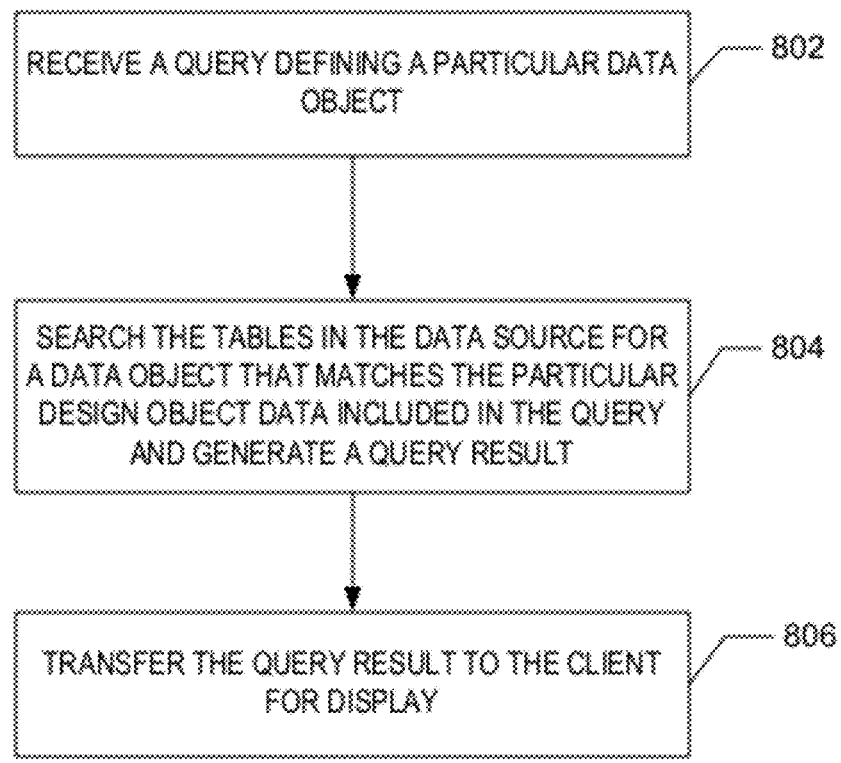
FIG. 8 illustrates a general method for retrieving relevant design data in according to aspects of the design resource system.

FIG. 8 illustrates a method for retrieving relevant design data in accordance with an aspect of UXD application 106. At 802, the UXD application 106 receives a query request from the client 112 that defines a particular data object. The UXD application 106 queries or filters the tables in the database for data object that matches the particular design data object included in the query and generates a query result at 804. At 806, UXD application 106 transmits the query result to the client computer for display.

The following examples illustrate methods for retrieving design data based on the particular design data object defined in a query according aspects of the invention.

Figure 9A:
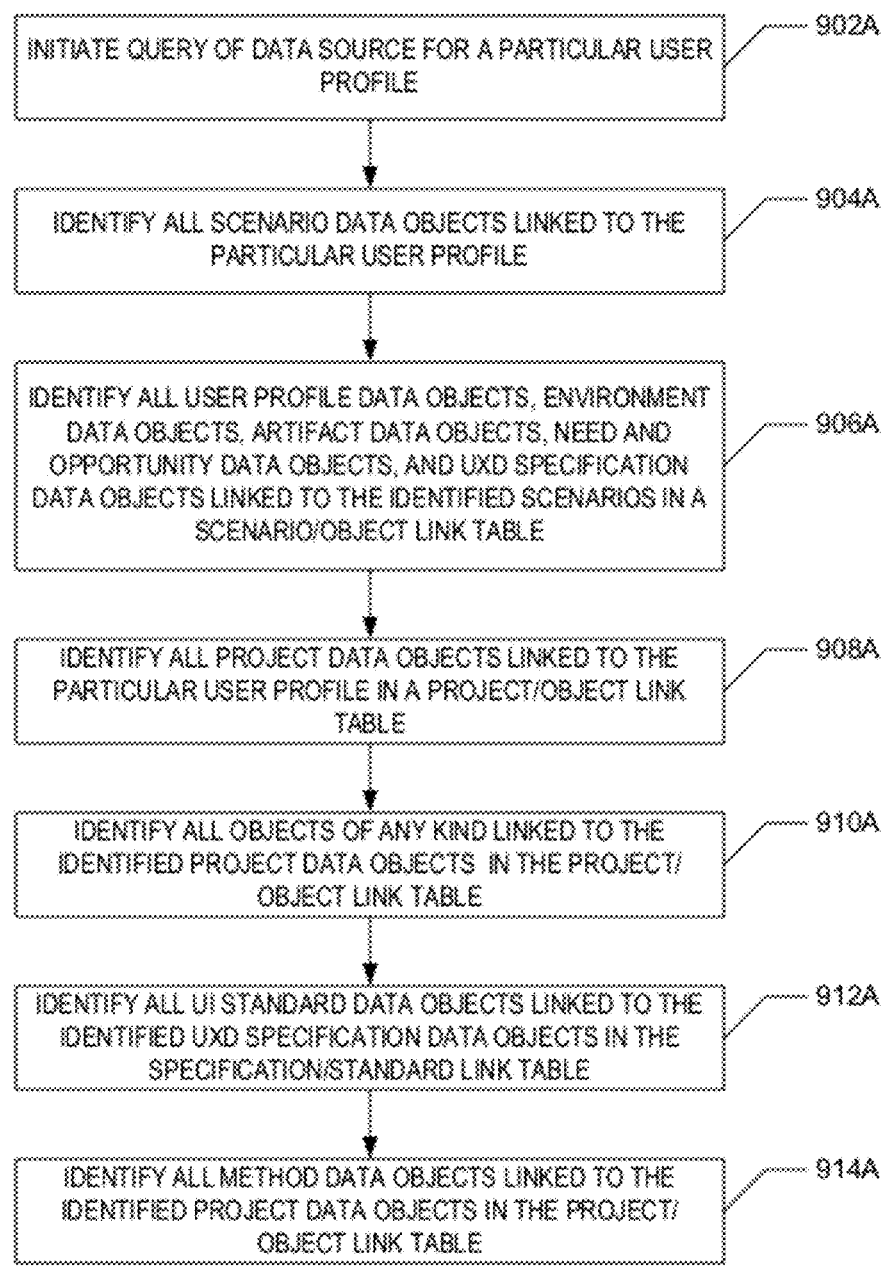
FIGS. 9A-9I illustrates exemplary methods for retrieving design data based on particular design data objects defined in a query.

FIG. 9A depicts an exemplary method for querying the data source for design data based on a user profile data object 201 defined in a query. At 902A, a user interacts with the query input form to enter or select a particular user profile to initiate query. All scenario data objects 202 linked to the particular user profile defined by the query are identified at 904A. According to one aspect, the linkages to the scenario data objects 202 are performed manually. For example, before initiating the query, the user interacts with the linkage form 720 to link specific scenarios data objects 202 to the user profile.

At 906A, all user profile data objects 201, environment data objects 204, artifact data objects 206, need and opportunity data objects 208, and all UXD specification data objects 210 linked to those scenarios data objects identified at 904A and in the scenario/object link table 302A are identified. All project data objects 212 linked to the particular user profile in the project/object link table 402A are identified at 908A. All UI standard data objects 216 that are linked to the UXD specification data objects identified at 906A and in the specification/standard link table 502A are identified at 910A. At 912A all method data objects 214 linked to the identified project data objects 212 in the project/object link table 402A are identified. At 914A, a query result is generated that includes all of the identified data objects.

Figure 9B:
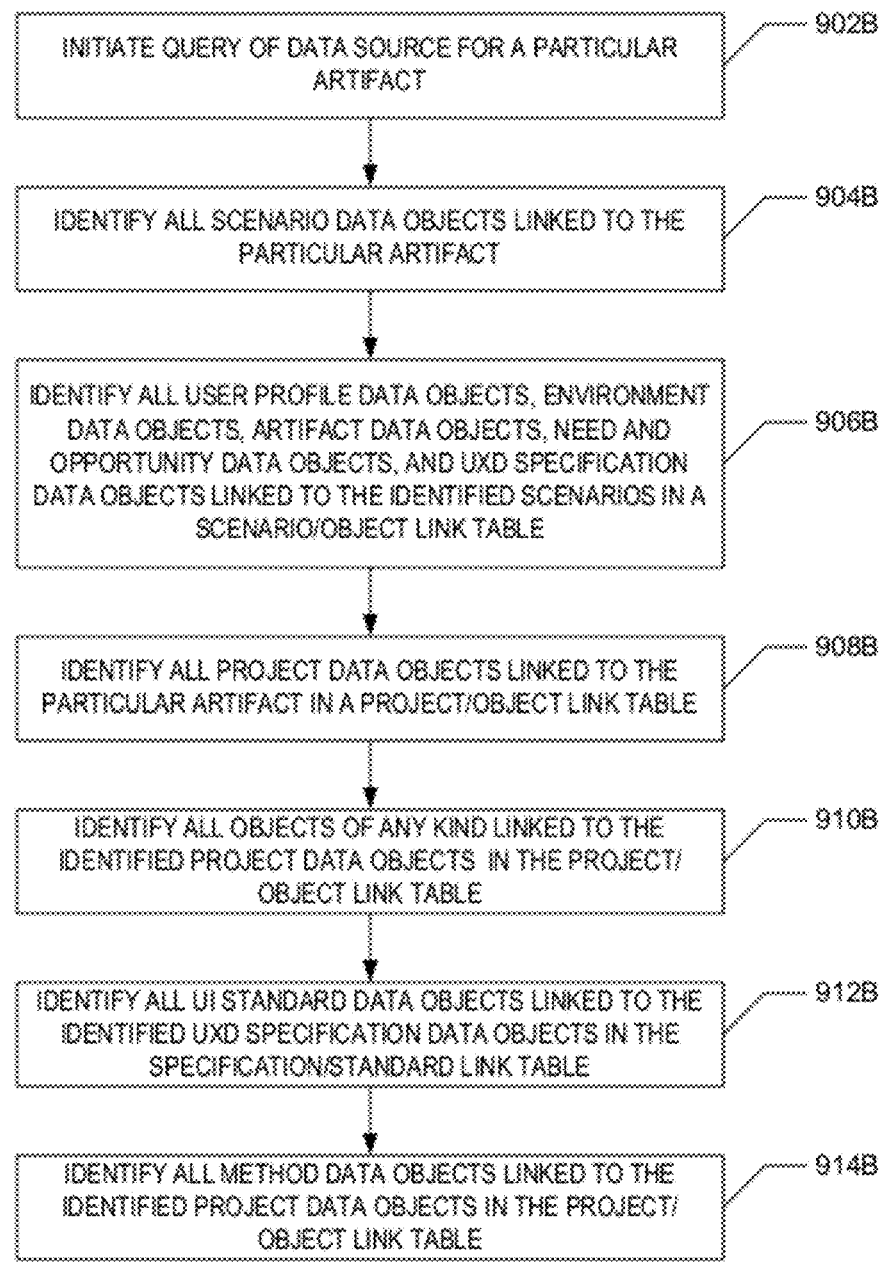

FIG. 9B depicts an exemplary method for querying the data source for design data based on an artifact data object defined in a query. At 902B, a user interacts with the query input form to enter or select a particular artifact. All scenario data objects linked to the particular artifact defined by the query are identified at 904B. According to one aspect, the linkages to the scenario data objects are performed manually. For example, before initiating the query, the user interacts with the linkage form 720 to link specific scenarios data objects to the artifact.

At 906B, all user profile data objects 201, environment data objects 204, artifact data objects 206, need and opportunity data objects 208, and all UXD specification data objects 210 linked to those scenarios data objects identified at 904B in the scenario/object link table 302A are identified. All project data objects linked to the artifact defined by the query in the project/object link table 402A are identified at 908B. All UI standard data objects 216 that are linked to the UXD specification data objects 210 identified at 906B in the specification/standard link table 502A are identified at 910B. At 912B all method data objects 214 linked to the identified project data objects in the project/object link table 402A are identified. At 914B, a query result is generated that includes all of the identified data objects.

Figure 9C:
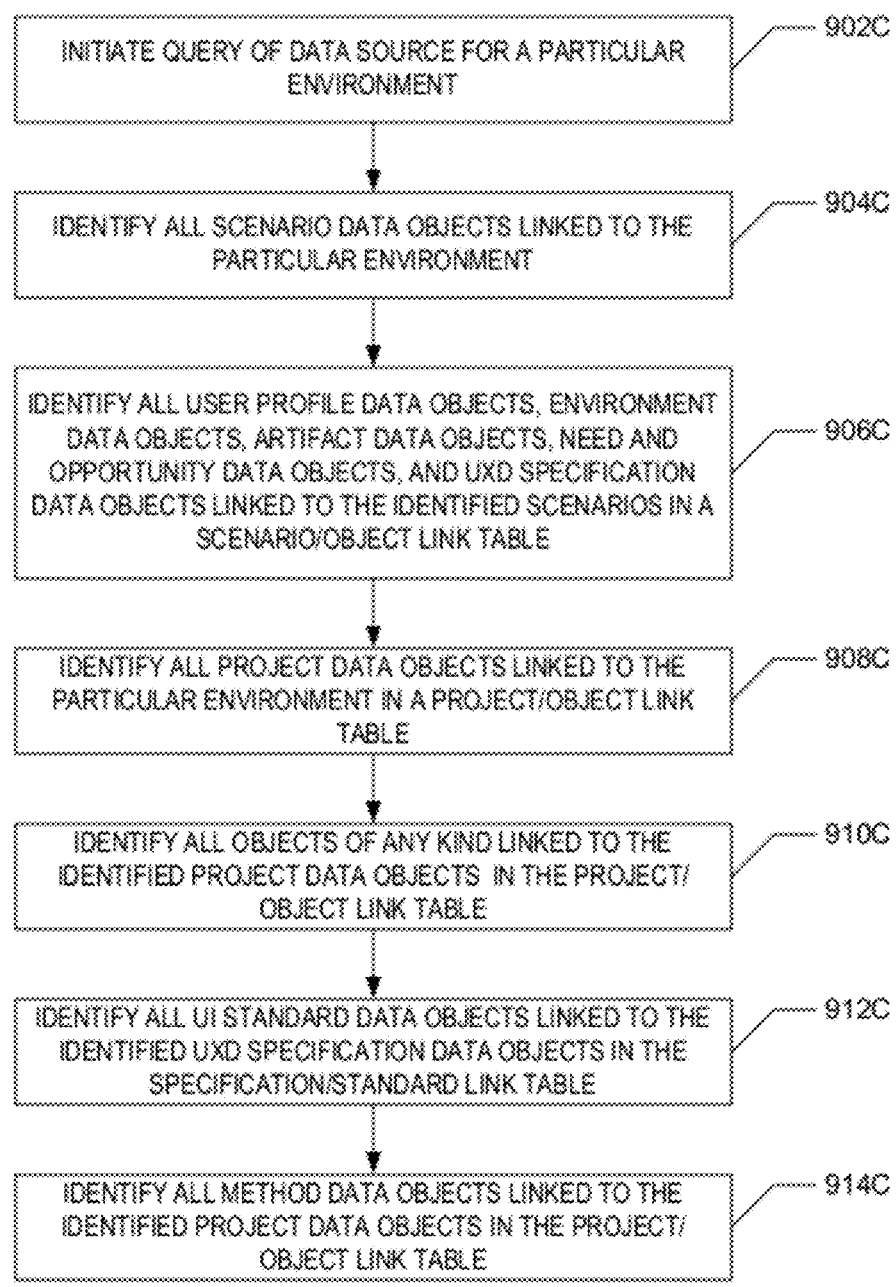

FIG. 9C depicts an exemplary method for querying the data source for design data based on an environment data object defined in a query. At 902C, a user interacts with the query input form to enter or select a particular environment. All scenario data objects linked to the particular environment defined by the query are identified at 904C. According to one aspect, the linkages to the scenario data objects are performed manually. For example, before initiating the query, the user interacts with the linkage form 720 to link specific scenarios data objects to the environment.

At 906C, all user profile data objects 201, environment data objects 204, artifact data objects 206, need and opportunity data objects 208, and all UXD specification data objects 210 linked to the scenarios data objects identified at 904C in the scenario/object link table 302A are identified. All project data objects 212 linked to the environment defined by the query in the project/object link table 402A are identified at 908C. All UI standard data objects 216 that are linked to the UXD specification data objects identified at 906C in the specification/standard link table 502A are identified at 910C. At 912C all method data objects 214 linked to the identified project data objects in the project/object link table 402A are identified. At 914C, a query result is generated that includes all of the identified data objects.

Figure 9D:
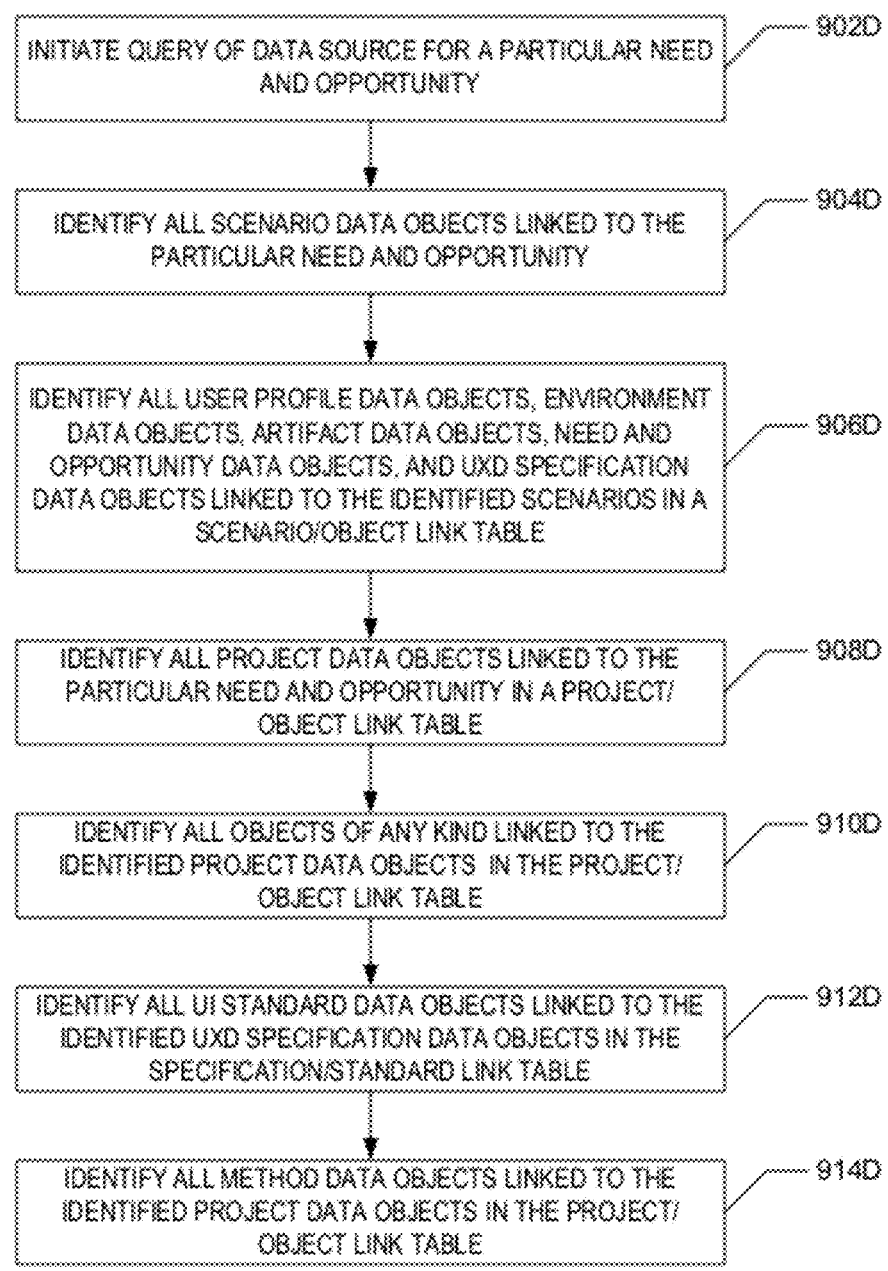

FIG. 9D depicts an exemplary method for querying the data source for design data based on a need or opportunity data object 208 defined in a query. At 902D, a user interacts with the query input form to enter or select a particular need or opportunity. All scenario data objects 202, linked to the particular need and opportunity defined by the query, are identified at 904D. According to one aspect, the linkages to the scenario data objects 202 are performed manually. For example, before initiating the query, the user interacts with the linkage form 720 to link specific scenarios data objects 202 to the particular need or opportunity.

At 906D, all user profile data objects 201, environment data objects 204, artifact data objects 206, need and opportunity data objects 208, and all UXD specification data objects 210 linked to scenarios data objects identified at 904D in the scenario/object link table 302A are identified. All project data objects 212 linked to the particular environment in the project/object link table 402A are identified at 908D. All UI standard data objects 216 that are linked to the UXD specification data objects 210 identified at 906C in the specification/standard link table 502A are identified at 910D. At 912D all method data objects 214 linked to the identified project data objects in the project/object link table 402A are identified. At 914D, a query result is generated that includes all of the identified data objects.

Figure 9E:
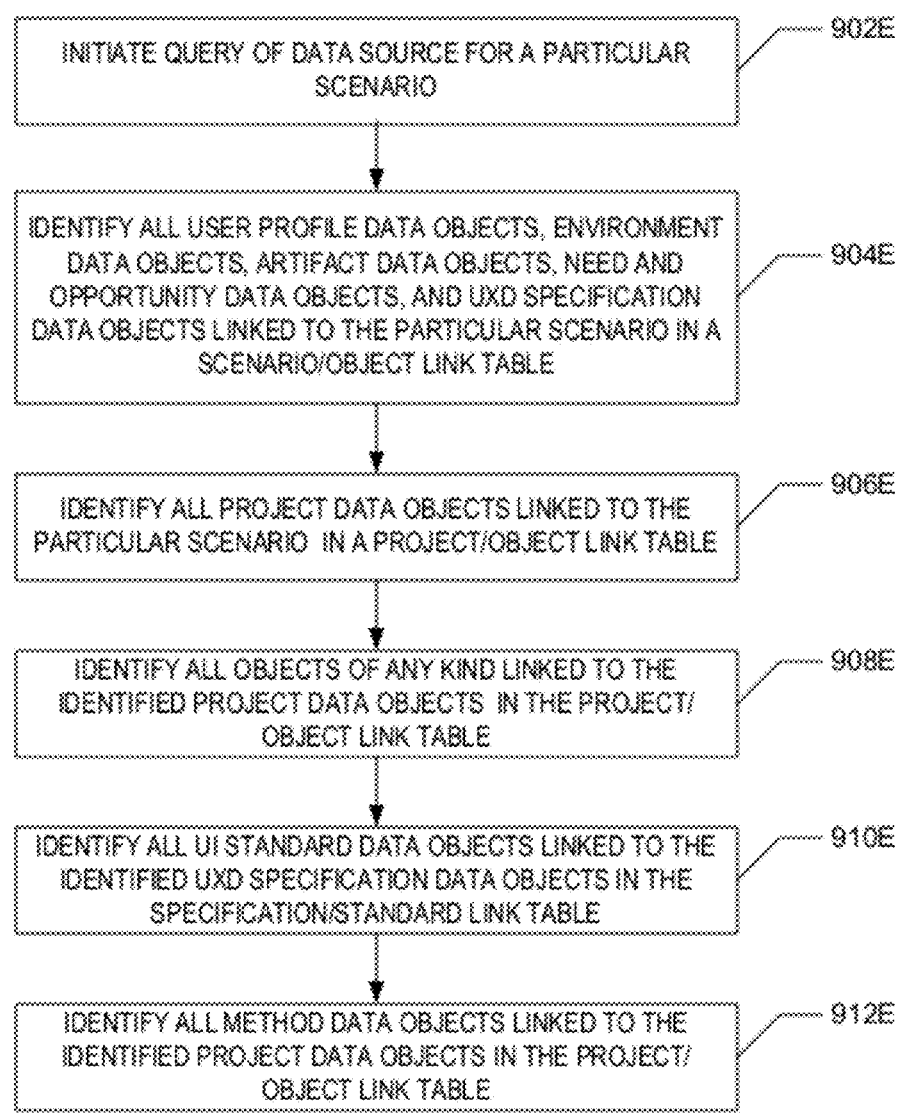

FIG. 9E depicts an exemplary method for querying the data source for design data based on a scenario data object 202 defined in a query. At 902E, a user interacts with the query input form to enter or select a particular scenario. At 904E, all user profile data objects 201, environment data objects 204, artifact data objects 206, need and opportunity data objects 208, and all UXD specification data objects 210 linked to the particular scenario in the scenario/object link table 302A are identified. All project data objects 212 linked to the particular scenario in the project/object link table 402A are identified at 906E. All UI standard data objects 216 that are linked to the UXD specification data objects 210, identified at 904E, in the specification/standard link table 502A are identified at 908E. At 910E all method data objects 214 linked to the identified project data objects in the project/object link table 402A are identified. At 912E a query result is generated that includes all of the identified data objects.

Figure 9F:
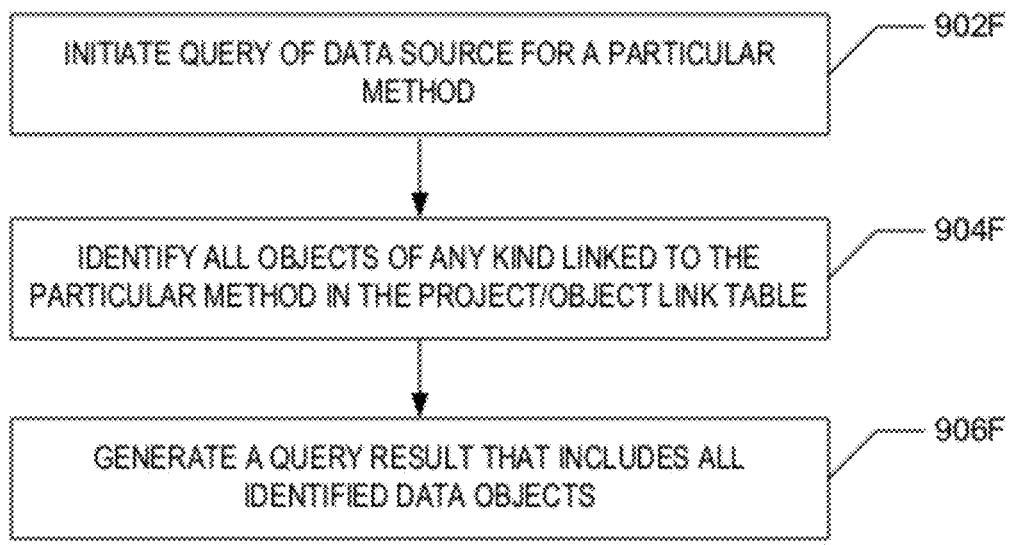

FIG. 9F depicts an exemplary method for querying the data source for design data based on a method data object 214 defined in a query. At 902F, a user interacts with the query input form to enter or select a particular method. All project data objects 212 linked to the particular method in the project/object link table 402A are identified in 904F. At 906F, all objects of any kind linked to the identified project data objects in the project/object link table 402A are identified. At 908F, a query result is generated that includes the all the identified data objects.

Figure 9G:
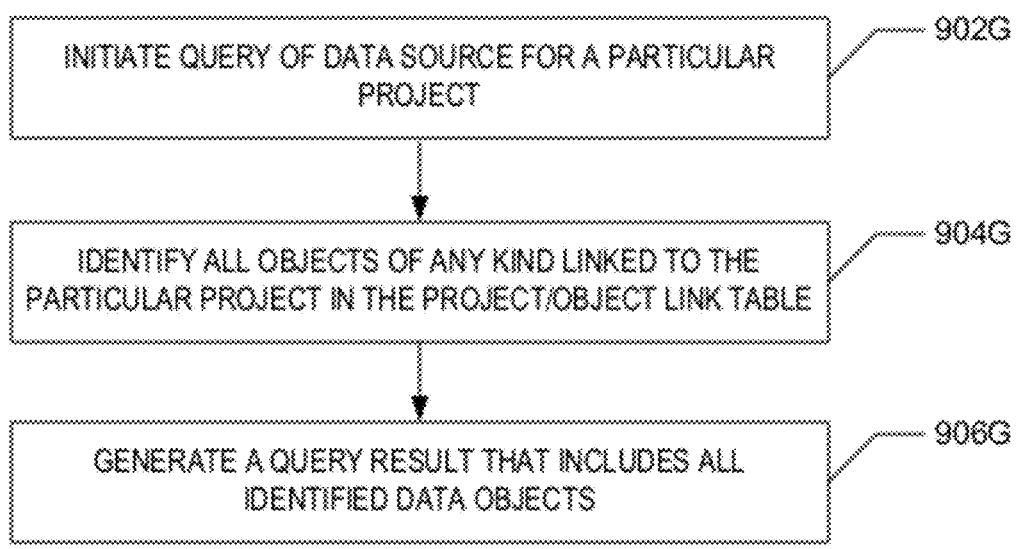

FIG. 9G depicts an exemplary method for querying the data source for design data based on a project data object 212 defined in a query. At 902G, a user interacts with the query input form to enter or select a particular project. All data object objects that are linked to that particular project in the project/object link table 402A are identified at 904G. At 906G, a query result is generated that includes all of the identified data objects.

Figure 9H:
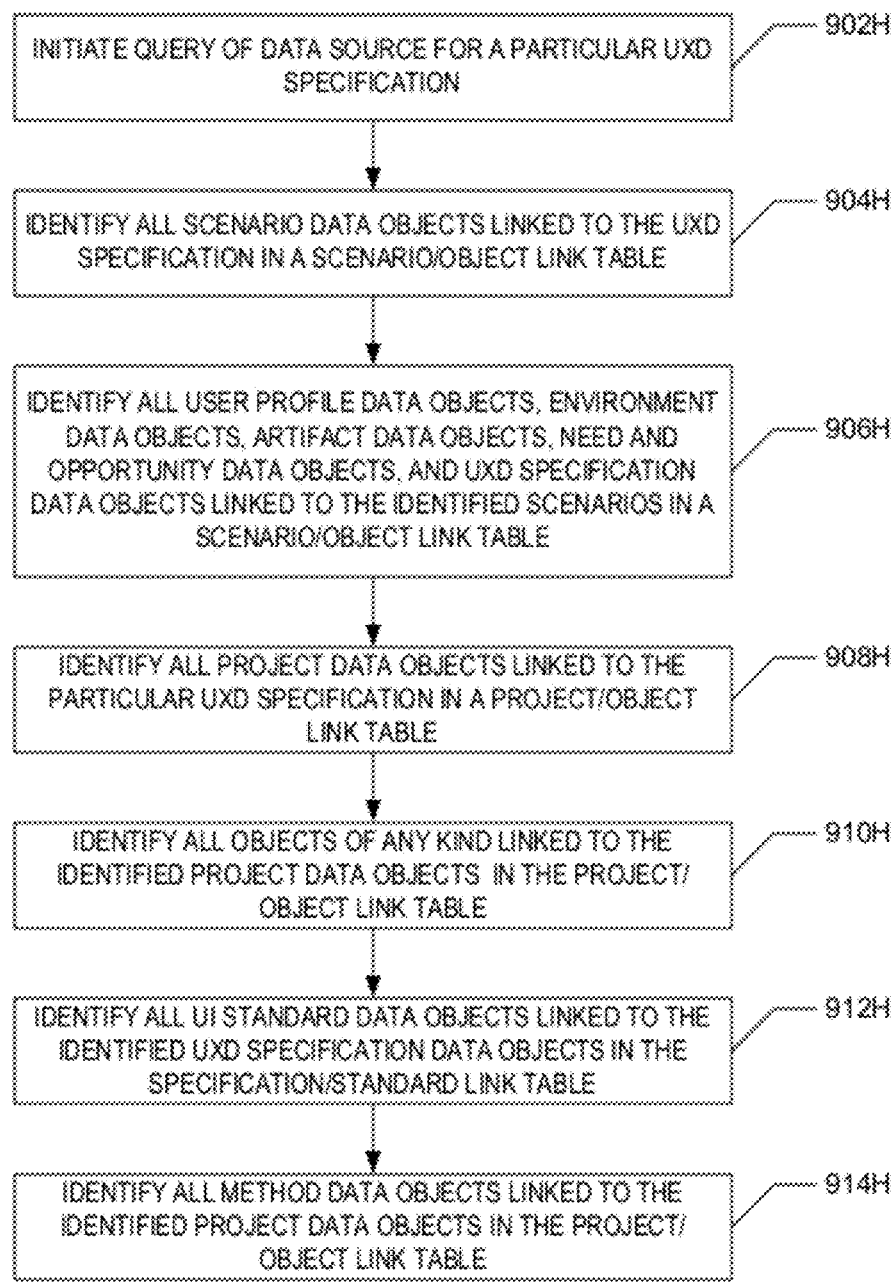

FIG. 9H depicts an exemplary method for querying the data source for design data based on a UXD specification data object 208 defined in a query. At 902H, a user interacts with the query input form to enter or select a particular UXD specification. All scenario data objects 202, linked to the particular UXD specification in the scenario/object link table 302A are identified at 904H. At 906H, all user profile data objects 201, environment data objects 204, artifact data objects 206, need and opportunity data objects 208, and all UXD specification data objects 210 linked to the identified scenario data objects in the scenario/object link table 302A are identified. All project data objects 212 linked to the particular UXD specification defined by the query in the project/ object link table 402A are identified at 908H. All UI standard data objects 216 that are linked to the UXD specification data objects 210 identified at 906I and in the specification/standard link table 502A are identified at 912H. At 914H all method data objects 214 linked to the identified project data objects in the project/object link table 402 are identified.

Figure 9I:
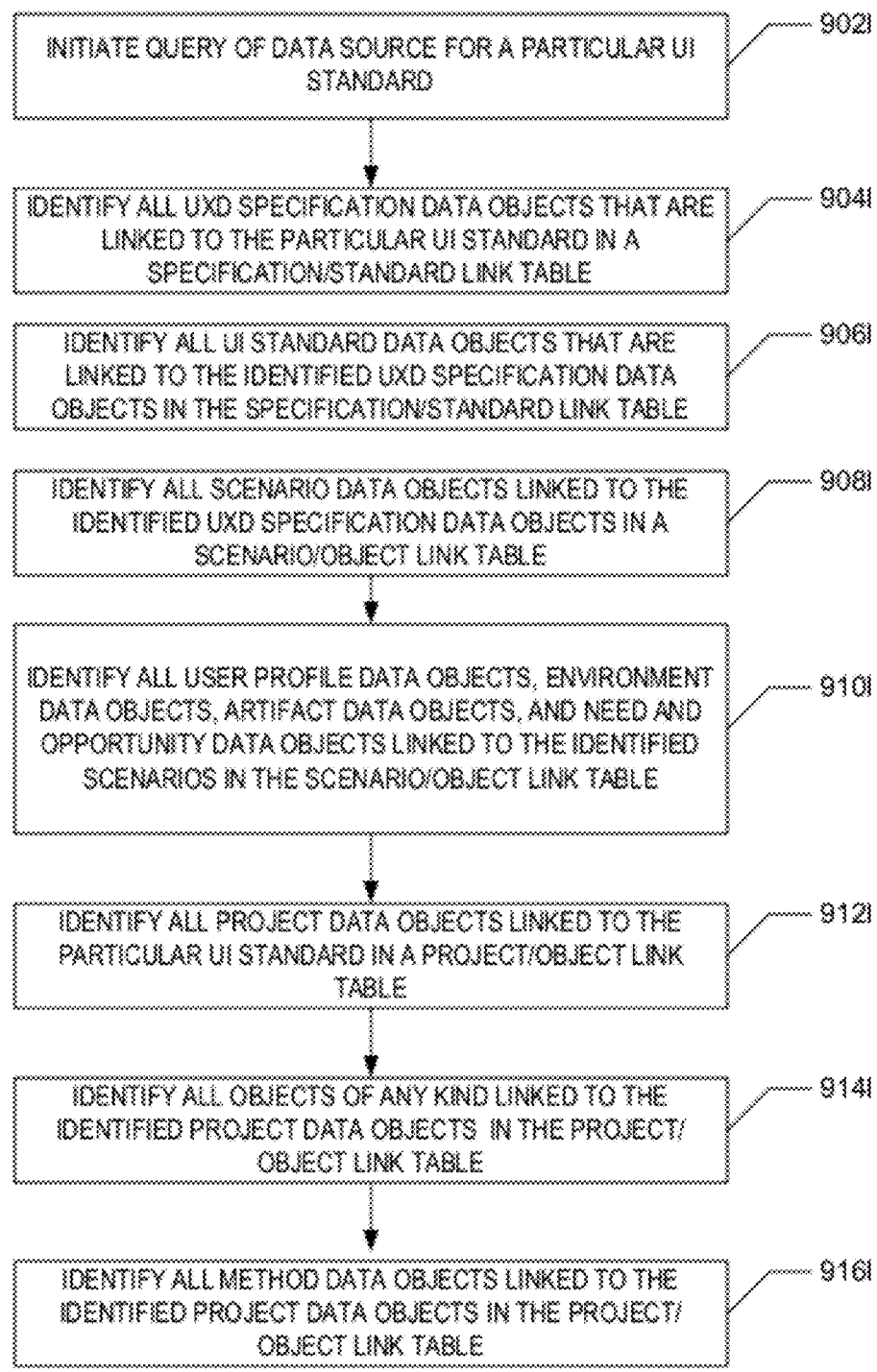

FIG. 9I depicts an exemplary method for querying the data source for design data UI standard data object 208 defined in a query. At 902I, a user interacts with the query input form to enter or select a particular UI standard. All UXD specification data objects 210 that are linked to the particular UI standard in the specification/standard link table 502A are identified at 904I. At 906I, all UI standard data objects 216 that are linked to the UXD specification data objects 210 identified at 904I and in the specification/standard link table 502A are identified. All scenario data objects 202 linked to the UXD specification data objects 210 in the scenario/object link table 302A are identified at 908I. At 910I, all user profile data objects 201, environment data objects 204, artifact data objects 206, need and opportunity data objects 208 linked to the scenarios data objects identified at 908J and in the scenario/object link table 302A are identified. All project data objects 212 linked to the particular UI standard in the project/object link table 402A are identified at 912I. At 916I all method data objects 214 linked to the identified project data objects in the project/object link table 402A are identified.

Those skilled in the art will appreciate that variations from the specific embodiments disclosed above are contemplated by the invention. The invention should not be restricted to the above embodiments, but should be measured by the following claims.

The invention claimed is:

1. A design resource system comprising:
at least one processor;
a data source comprising:
a first table defining a first linking relationship between a primary data object and at least one secondary data object;
a second table defining a second linking relationship between a different primary data object and a different at least one secondary data object, wherein the different primary data object is disparate from the primary data object, and wherein the different at least one secondary data object is disparate from the at least one secondary data object; and
a third table defining a third linking relationship between a second different primary data object and a second different at least one secondary data object, wherein the second different primary data object is disparate from the different primary object, and wherein the second different at least one secondary data object is disparate from the at least one secondary data object;
a design resource application executed by the processor to:
receive a linking request, the linking request defining at least one of the first linking relationship, the second linking relationship, and the third linking relationship for disparate data objects;
receive a query request, the query request specifying a particular data object;
query the data source in response to the query request to identify a matching primary objects comprising:
a particular primary data object matching the particular data object and,
a particular different primary data object matching the particular data object, and
a particular second different primary object matching the particular data object;
generate at least one query result without cross indexing, comprising:
the matching primary data objects and corresponding secondary data object based on the first linking relationship, corresponding different at least one secondary data object based on the second linking relationship, and corresponding second different at least one secondary data object based on the third linking relationship; and
transmit the query result via a result form for display, the result form comprising a listing of matching primary data objects and the corresponding secondary data objects, corresponding different at least one secondary data object, and corresponding second different at least one secondary data object.

2. The system of claim 1 wherein:
the primary data object comprises a scenario data object; and
the at least one secondary data object is selected from the at least one member of a group consisting of a user profile data object, an environment data object, and artifact data object, a needs and opportunities data object, and an applications or offerings data object.

3. The system of claim 1 wherein:
the different primary data object comprises a project data object; and
the different at least one secondary data object is selected from the at least one member of a group consisting of a user profile data object, an environment data object, and artifact data object, a needs and opportunities data object, and an applications or offerings data object.

4. The system of claim 1 wherein:
the second different primary data object comprises a standard data object; and
the second different at least one secondary data object comprises a specification data object.

5. The system of claim 1 wherein the result form is transmitted to a client computing device for display.

6. The system of claim 1 wherein the design resource application is further configured to:
transmit at least one of a plurality of input forms for display, each of the plurality of input forms being associated with a different data object type;
receive a storage request, the storage request specifying a particular new data object, wherein the storage request is generated in response to input received via a corresponding input form; and
store the particular new data object in at least one of the first table, the second table, and the third table based on a data object type associated with the corresponding input form.

7. The system of claim 6 wherein the plurality of input forms are selected from at least one member of another group consisting of a user profile input data form, a scenario data input form, an environment data input form, an artifact data input form, a need or opportunity data input form, an applications or offerings data input form, a project data input form, a methods data input form, a standards input form.

8. A computer-readable medium encoded with a design resource application comprising modules executable by a processing device to retrieve design data from a data source, the design resource application comprising:
a filter module to:
receive a query request, the query request specifying a particular data object;

query a data source to identify matching primary data
objects in response to the query request, wherein the
data source comprises:
a first table defining a first linking relationship
between a primary data object and at least one
secondary data object,
a second table defining a second linking relationship
between a different primary data object and a different
at least one secondary data object, wherein
the different primary data object is disparate from
the primary data object, and wherein the different at
least one secondary data object is disparate from
the at least one secondary data object; and
a third table defining a third linking relationship
between a second different primary data object and
a second different at least one secondary data
object, wherein the second different primary data
object is disparate from the different primary
object, and wherein the second different at least one
secondary data object is disparate from the at least
one secondary data object and wherein the matching
primary data objects comprise:
a particular primary data object matching the particular
data object;
a particular different primary data object matching
the particular data object, and
a particular second different primary object matching
the particular data object; and
generate at least one query result without cross indexing
comprising the matching primary data objects and
corresponding secondary data objects based on the
first linking relationship, corresponding different at
least one secondary data object based on the second
linking relationship, and corresponding second different
at least one secondary data object based on the
third linking relationship;
a storage module to receive a linking request, the linking
request defining at least one of the first linking relationship,
the second linking relationship, and the third linking
relationship for disparate data objects; and
a user interface module to transmit the query result via a
result form for display, the result form comprising a
listing of matching primary data objects the corresponding
secondary data objects, corresponding different at
least one secondary data object, and corresponding second
different at least one secondary data object.

9. The computer-readable medium of claim 8 wherein:
the primary data object comprises a scenario data object;
and
the at least one secondary data object is selected from the at
least one member of a group consisting of a user profile
data object, an environment data object, and artifact data
object, a needs and opportunities data object, and an
applications or offerings data object.

10. The computer-readable medium of claim 8 wherein:
the different primary data object comprises a project data
object; and
the different at least one secondary data object is selected
from the at least one member of a group consisting of a
user profile data object, an environment data object, and
artifact data object, a needs and opportunities data
object, and an applications or offerings data object.

11. The computer-readable medium of claim 8 wherein:
the second different primary data object comprises a standard
data object; and
the second different at least one secondary data object
comprises a specification data object.

12. The computer-readable medium of claim 8 wherein the
user interface module transmits the result form to a client
computing device for display.

13. The computer-readable medium of claim 8 wherein:
the user interface module further transmits at least one of a
plurality of input forms for display, each of the plurality
of input forms being associated with a different data
object type; and
the storage module to:
receive a storage request, the storage request specifying
a particular new data object, wherein the storage
request is generated in response to input received via
a corresponding input form; and
store the particular new data object in at least one of the
first table, the second table, and the third table based
on a data object type associated the at least one input
form.

14. The computer-readable medium of claim 13 wherein
the plurality of input forms are selected from at least one
member of another group consisting of a user profile input
data form, a scenario data input form, an environment data
input form, an artifact data input form, a need or opportunity
data input form, an applications or offerings data input form,
a project data input form, a methods data input form, a standards
input form.

15. A method for retrieving design data from a data source
comprising:
receiving a linking request at a processor, the linking
request defining o at least one of a first linking relationship,
a second linking relationship, and a third linking
relationship for disparate data objects;
receiving a query request at the processor, the query
request specifying a particular data object;
querying a data source to identify a matching primary data
objects in response to the query request, wherein the data
source comprises:
a first table defining the first linking relationship
between a primary data object and at least one secondary
data object,
a second table defining the second linking relationship
between a different primary data object and a different
at least one secondary data object, wherein the different
primary data object is disparate from the primary
data object, and wherein the different at least one
secondary data object is disparate from the at least one
secondary data object; and
a third table defining the third linking relationship between
a second different primary data object and a second
different at least one secondary data object, wherein the
second different primary data object is disparate from
the different primary object, and wherein the second
different at least one secondary data object is disparate
from the at least one secondary data object, and wherein
the matching primary data objects comprise:
a particular primary data object matching the particular
data object;
a particular different primary data object matching the
particular data object; and
a particular second different primary object matching
the particular data object;
generating at least one query result without cross indexing
at the processor, the query result comprising the matching
primary data objects based on the first linking relationship,
corresponding different at least one secondary
data object based on the second linking relationship, and corresponding second different at least one secondary data object based on the third linking relationship secondary data objects; and transmit the query result via a result form for display, the result form comprising a listing of matching primary data objects and the corresponding secondary data objects, corresponding different at least one secondary data object, and corresponding second different at least one secondary data object.

16. The method of claim 15 further comprising:

transmitting at least one of a plurality of input forms for display, each of the plurality of input forms being associated with a different data object type;

receiving a storage request at the processor, the storage request specifying a particular new data object, wherein the storage request is generated in response to input received via a corresponding input form; and storing the particular new data object in at least one of the first table, the second table, and the third table based on a data object type associated with the corresponding input form.

17. The method of claim 16 wherein the plurality of input forms are selected from at least one member of another group consisting of a user profile input data form, a scenario data input form, an environment data input form, an artifact data input form, a need or opportunity data input form, an applications or offerings data input form, a project data input form, a methods data input form, a standards input form.

* * * * *